April 17, 1934.　　A. P. FLETCHER ET AL　　1,955,453
WEATHER PAD CONSTRUCTION
Filed June 20, 1932　　2 Sheets-Sheet 1
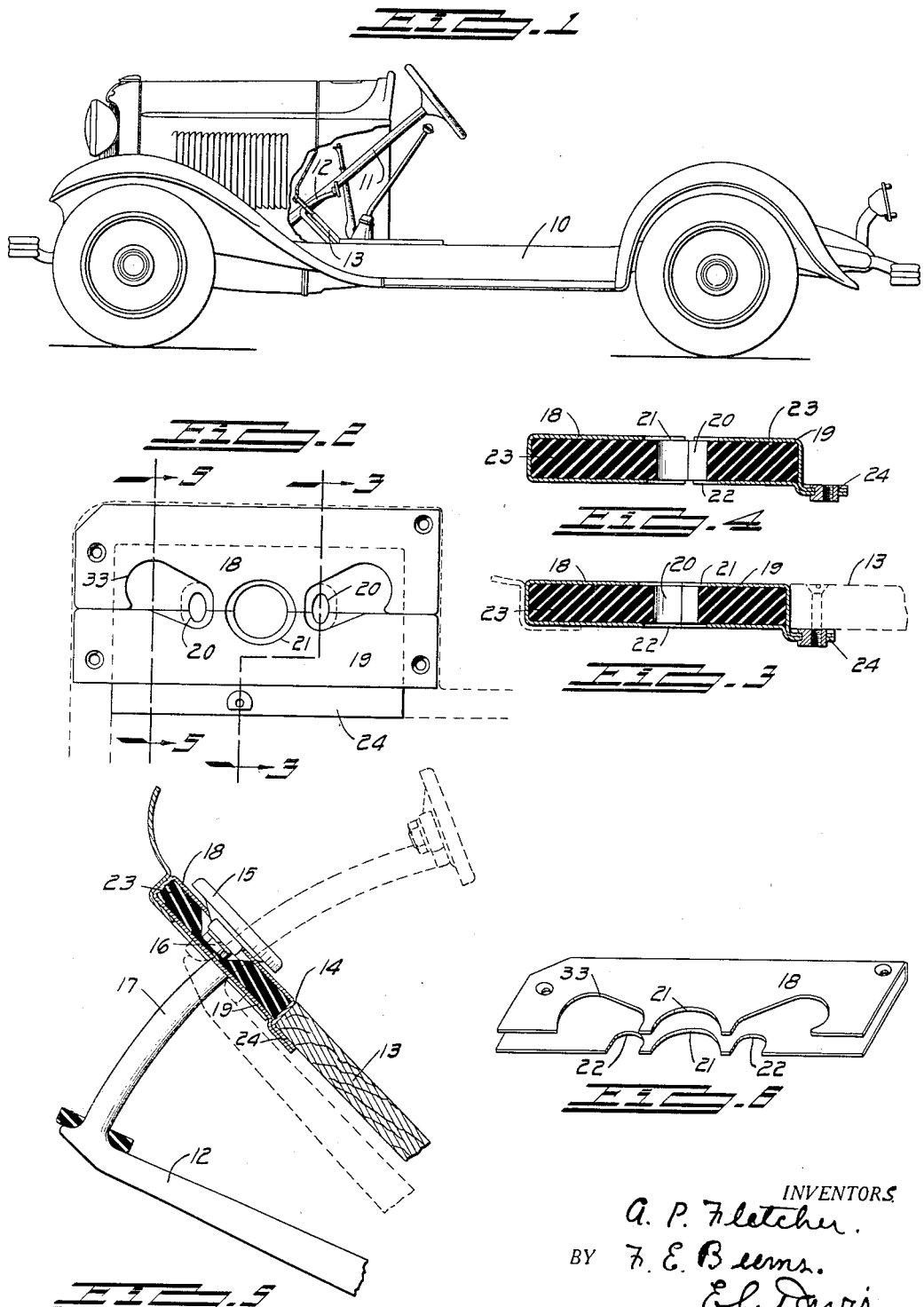

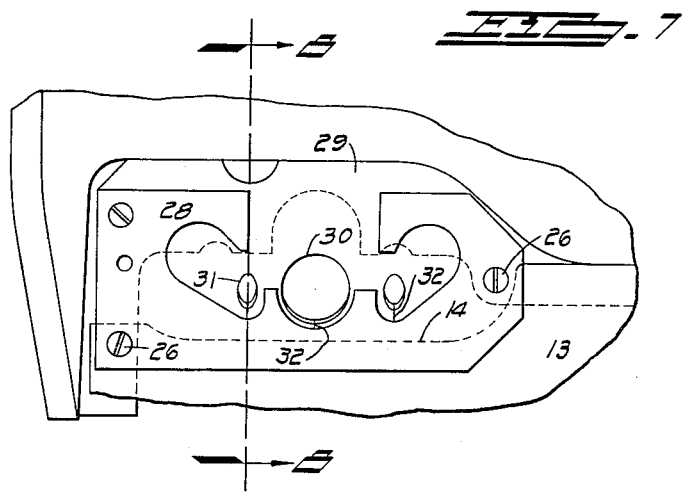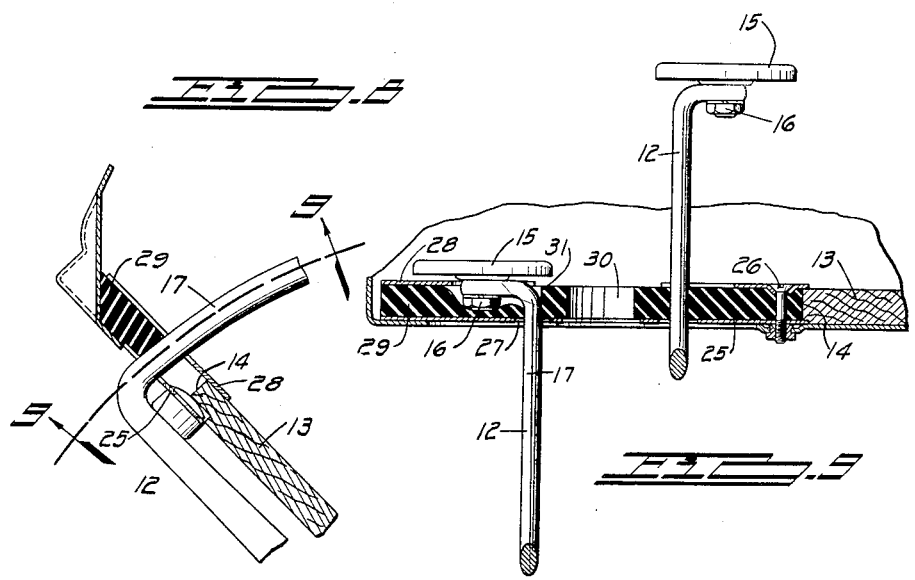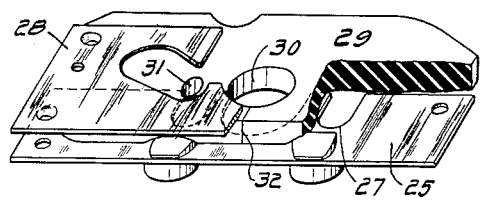

Patented Apr. 17, 1934

1,955,453

UNITED STATES PATENT OFFICE 1,955,453

WEATHER PAD CONSTRUCTION

Arthur P. Fletcher, Huntington Woods, and Floyd E. Beems, Dearborn, Mich., assignors to Ford Motor Company, Dearborn, Mich., a corporation of Delaware Application June 20, 1932, Serial No. 618,270

7 Claims. (Cl. 180—90.6)

The object of our invention is to provide a weather pad of simple, durable and inexpensive construction.

More specifically, the object of our invention is to provide a device for use on automobile bodies which will fit around the control pedals and prevent the air, gases and fumes from the engine compartment from entering the body at this point. It is well known that in the conventional automobile construction clutch and brake pedals extend up through suitable openings provided in the floor boards of the car, and that because of the vibration of such pedals considerable clearance must be provided between the edges of these openings and pedal arms, otherwise rattles will be set up. When sufficient clearance is provided to eliminate rattles at these points, openings result through which air and gases from the engine compartment are forced into the body of the car. It has heretofore been customary to provide a slotted felt pad which is fastened to the floor boards around the pedals so as to stop the flow of air through these openings. However, the trouble had with all such devices is that the slots in such felt pads invariably become enlarged thereby destroying the utility of the device.

In our novel construction we have provided a sponge rubber insert adapted to fit around these pedals which insert is secured in place by a metallic retainer. The sponge rubber is provided with openings therein through which the pedals slide and which provides a resilient contacting surface much superior to the surface of any structure heretofore known to the applicants. Tests have proven that our sponge rubber insert allows the pedals to move freely while retaining a closure therearound during substantially the life of the car.

With these and other objects in view, our invention consists in the arrangement, construction and combination of the various parts of our improved device, as described in the specification, claimed in our claims, and illustrated in the accompanying drawings, in which:

Figure 1 shows a side elevation of an automobile having our improved device installed therein, part of the vehicle being broken away to better illustrate the construction.

Figure 2 shows a plan view of one form of our improved pedal device.

Figure 3 shows a sectional view, taken on the line 3—3 of Figure 2.

Figure 4 shows a sectional view, similar to that shown in Figure 3, illustrating the relative positions of the parts of the device before being installed in their positions.

Figure 5 shows a sectional view through an installed weather pad, taken on the line 5—5 of Figure 2.

Figure 6 shows a perspective view of the upper half of our weather pad retainer, to better illustrate the construction.

Figure 7 shows a plan view of an alternate form of our improved device.

Figure 8 shows a sectional view, taken on the line 8—8 of Figure 7, the pedal arm being shown in place.

Figure 9 shows a sectional view, taken on the line 9—9 of Figure 8, showing one pedal depressed and the other in its free position, and Figure 10 shows a perspective view of this form of device, the metal retainer and sponge rubber insert being shown in the positions in which they are installed in the car.

Referring to the accompanying drawings, we have used the reference numeral 10 to indicate generally the chassis of a motor vehicle, this chassis having a diagonally extending steering post 11 and a pair of conventional foot operated pedals 12 disposed one on each side of said steering post. A plurality of floor boards 13 extend across that portion of the vehicle adjacent to the pedals 12, these floor boards having a rectangular shaped opening 14 or notch removed therefrom, or formed adjacent thereto through which the steering post and pedals extend.

It will be noted from the drawings that each of the pedals 12 is forged with a radially extending arm pivoted at one end and having a circumferentially extending portion 17 extending from the free end thereof, this circumferential portion having its free end bent axially and having an eye formed thereon to which a foot rest 15 is secured by means of a nut 16. Thus, actuation of the pedal simply oscillates the circumferential portion 17 through the opening 14 in the conventional manner.

Referring to Figure 2, we have shown one form of our improved device which is adapted to form a closure for the opening 14 and still allow free operating movement of the pedals. This device consists of a strip of sheet metal 18 bent back upon itself and of such size that it substantially fills the space between the upper portion of the opening 14 and the pedals. A correspondingly U shaped sheet metal member 19 is adapted to coact with the member 18 and fill the space between the lower edge of the opening 14 and the pedals. The members 18 and 19 together form a substantial closure for the whole opening 14. Suitable semi-circular notches 21 are provided in the abutting edges of these members so that the steering post may extend therethrough, and in like manner other notches 22 are provided so that the circumferential portion 17 of the pedal may extend therethrough. It will be noted from the drawings that considerable clearance is provided between these notches and the pedals and steering post so that vibration of these members relative to the floor boards will not set up rattles.

In order to close this clearance space between the notches and the steering post and pedals, we have provided a pair of inserts 23 formed from sponge rubber, one of these inserts fitting within the member 18 while the other fills the space within the member 19. Suitable notches 20 are provided in these inserts for the reception of the pedals and the steering post, however these notches form openings considerably smaller than the pedal portion or steering post therein so that the edges of these notches are in intimate contact with the pedals and post.

When it is desired to assemble this device, the member 18 is first securely fastened in place and then the member 19 is pushed up against the lowermost edge thereof, the inserts 23 being of such size that they are compressed when assembled in place, as shown in Figure 4, so as to bring the notched portions of these inserts into intimate contact with the steering post and portion 17 of each of the control pedals. Thus, the pedals may be actuated through their normal strokes and the notched portions of the sponge rubber will form a seal to prevent the passage of air therearound.

It will be noted from Figures 2 and 3 that the lower edge of the member 19 is formed with a flange 24 thereon substantially in alignment with the flange which retains the floor boards 13 so that the floor boards of the car may also be fastened to this flange. It will further be noted that the members 18 and 19 are of the same thickness as the floor boards so that the upper surfaces of these members will lie flush with the floor boards and form a continuation thereof.

From Figures 2 and 6 it will be seen that the upper surface of the member 18 is provided with relieved portions 33 somewhat larger than the notches 22, these relieved portions being provided so that when the pedal is pressed to its extreme downward position, the nut 16 and eye will be forced into the insert 23, as shown in Figure 5. A decided safety factor results from this construction, especially in connection with the brake pedal. Heretofore, when brake pedals were pressed down to the floor boards they would invariably come to an abrupt stop at the instant the pedal portion struck the floor. As many operators of vehicles allow their brakes to become out of adjustment, thereby requiring an increasingly longer stroke on the brake pedal to stop the car, it sometimes happens that the operator in normally stopping the car will be pressing his brake pedal down within a fraction of an inch of the upper face of the floor board. If it is required at this time to make a sudden stop, then the further depression of the pedal simply forces it against the floor boards but does not further apply the brakes. With the disclosed device the brake is not abruptly stopped when it strikes the upper face of the insert 23 but is allowed to move still further, the insert providing a gradually increasing resistance to movement of the pedal but not abruptly stopping the same. For this reason by pressing a little harder on the pedal the brakes can be applied fully even though the normal application of the brake requires the pedal to be pressed down flush with the floor boards. Thus, warning is given to the operator of the unadjusted condition of his brakes.

Referring now to Figures 7 through 10, we have shown an alternate construction which is somewhat cheaper to manufacture than the previously described device and which is very efficient. In this arrangement we have provided a plate 25 which is secured to the floor board retaining flanges of the car by means of screws 26, this plate 25 having a central U shaped notch in its upper edge adapted to straddle the steering post while a pair of notches 27, disposed one on each side of the steering post notch, provide clearance for the control pedals. After the plate 25 is assembled in position, the floor boards 13 are assembled in place, these floor boards having one corner thereof cut away to provide a rectangular shaped opening around the pedals so that a sponge rubber insert 29 formed slightly thicker than the thickness of the floor board may be inserted therein. This insert 29 is provided with a central circular opening 30 having smaller openings 31 disposed on each side thereof and slots 32 extend from the lower edge of this insert up to each of these openings. The insert 29 is installed by simply sliding the slots over the pedals and steering column. A second plate 28 is then fastened down over the top of the insert 29, the upper edge of this plate being notched so that it may be assembled in position. It will be noted that relieved portions similar to the portions 33 are also provided in this plate so that the pedal pad retaining nuts 16 may be forced down into the sponge rubber insert 29 to thus function in the manner similar to the previously described structure.

Among the many advantages arising from the use of our improved device it may be well to mention that with this arrangement the sponge rubber is placed under compression to thereby intimately bear against the abutting portions of the reciprocating levers and thus form an air-tight seal therewith. Still further, our device lies flush with the floor boards of the car so that a carpet or floor mat may lie flat when installed over the major portion of the device.

Some changes may be made in the arrangement, construction and combination of the various parts of our improved device without departing from the spirit of our invention and it is our intention to cover by our claims such changes as may reasonably be included within the scope thereof.

We claim as our invention:

1. In a device for forming a closure around the control pedals of a motor vehicle said vehicle having the floor boards thereof constructed so that a relatively large opening is provided around said pedals, a pair of plates spaced apart substantially the thickness of said floor boards and secured adjacent thereto so as to form a continuation thereof and partially close said opening, a substantial clearance being provided between the edges of said plates and said pedals, and a sponge rubber insert disposed between said plates, said insert being retained under compression by said plates whereby the portions thereof adjacent to said pedals are forced into intimate contact with the pedals to complete the closure.

2. In a device for forming a closure around the control pedals of a motor vehicle said vehicle having the floor boards thereof constructed so that a rectangular shaped opening is provided around said pedals, a pair of metal plates spaced apart substantially the thickness of said floor boards and secured adjacent thereto so as to form a continuation thereof and partially close said opening, a substantial clearance being provided between said plates and the pedals, and a sponge rubber insert disposed between said plates completing said closure, said insert being retained under compression by said plates whereby the portions thereof adjacent to said pedals are forced into intimate contact therewith to complete the closure.

3. In a device for forming a closure around the control pedals of a motor vehicle said vehicle having the floor boards thereof constructed so that a relatively large opening is provided around said pedals, a pair of plates spaced apart substantially the thickness of said floor boards and secured adjacent thereto so as to form a continuation thereof and partially close said opening a substantial clearance being provided between said plates and said pedals, and a sponge rubber insert disposed between said plates completing said closure, the upper of said plates having portions removed therefrom adjacent to said pedals whereby the foot rest portions of said pedals will be stopped at the end of the pedal stroke by contact with said sponge rubber insert.

4. In a device for forming a closure around the control pedals of a motor vehicle said vehicle having the floor boards thereof constructed so that a relatively large opening is provided around said pedals, a metal plate secured to the floor board retaining flanges of the vehicle so as to form a continuation of the underside of the floor boards and partially close said opening, said plate having notches therein in which pedals are loosely received, a sponge rubber insert substantially the thickness of said floor boards positioned on top of said plate, said sponge rubber member having notches therein in which said pedals are closely received, and a second plate secured over the top of said sponge rubber insert retaining said insert under compression whereby the portions thereof adjacent to said pedals are forced into intimate contact therewith.

5. In a device for forming a closure around the control pedals of a motor vehicle said vehicle having the floor boards thereof constructed so that a relatively large opening is provided around said pedals, a plate secured adjacent to the floor boards of the vehicle so as to form a continuation of the underside of said boards and partially close said opening, a second plate extending across said opening so as to partially close same and secured in position spaced above the first mentioned plate, and a sponge rubber insert disposed between said plates completing said closure, said second mentioned plate having portions removed therefrom adjacent to said pedals to form clearance spaces so that the foot-rest portions of said pedals will be stopped at the end of the pedal stroke by contacting said sponge rubber insert.

6. In a device for forming a closure around the control pedals of a motor vehicle, said vehicle having the floor boards thereof constructed so that a relatively large opening is provided around said pedals, a metal plate forming a continuation of the underside of said floor boards adapted to partially close said opening, a second metal plate forming a continuation of the upperside of said floor boards and partially closing said opening, and a sponge rubber insert disposed between said plates completing said closure, the upper of said plate having portions removed therefrom adjacent to said pedals, whereby laterally extending portions on the upper ends of said pedals will stop the pedals at the end of the pedal stroke by contacting with said sponge rubber insert.

7. A device for form a closure around the control pedals of a motor vehicle said vehicle having the floor boards thereof constructed so that a relatively large opening is provided around said pedals, a metal plate forming a continuation of the underside of said floor boards and partially closing said opening, a substantial clearance being provided between said plate and the shanks of said pedals, and said pedals having laterally extending portions on their upper ends which bear against said plate when the pedals are fully depressed, a sponge rubber insert disposed between said laterally extending portions and said plate so as to resiliently stop said pedals at the ends of their strokes, and a second metal plate secured over said sponge rubber insert having portions removed therefrom so as to leave clearance spaces for said laterally extending portions to contact said rubber insert, for the purpose described.

ARTHUR P. FLETCHER.
FLOYD E. BEEMS.